(12) United States Patent
Gotzen

(10) Patent No.: US 9,938,387 B2
(45) Date of Patent: Apr. 10, 2018

(54) EPDM WIPER RUBBER

(71) Applicant: Robert Bosch GmbH, Stuttgart (DE)

(72) Inventor: Nicolaas Gotzen, Kartenberg (BE)

(73) Assignee: Robert Bosch GmbH, Stuttgart (DE)

( * ) Notice: Subject to any disclaimer, the term of this patent is extended or adjusted under 35 U.S.C. 154(b) by 623 days.

(21) Appl. No.: 14/385,297

(22) PCT Filed: Mar. 14, 2013

(86) PCT No.: PCT/EP2013/055256
§ 371 (c)(1),
(2) Date: Sep. 15, 2014

(87) PCT Pub. No.: WO2013/135823
PCT Pub. Date: Sep. 19, 2013

(65) Prior Publication Data
US 2015/0047142 A1    Feb. 19, 2015

(30) Foreign Application Priority Data

Mar. 14, 2012   (DE) .................. 10 2012 204 016

(51) Int. Cl.
*C08J 7/12*    (2006.01)
*B29C 71/04*    (2006.01)
(Continued)

(52) U.S. Cl.
CPC ............... *C08J 7/123* (2013.01); *B29C 71/04* (2013.01); *B60S 1/38* (2013.01);
(Continued)

(58) Field of Classification Search
CPC .. B29C 71/04; B29L 2023/16; B29L 2105/24; B29L 2035/0827; C08J 7/123;
(Continued)

(56) References Cited

U.S. PATENT DOCUMENTS 4,256,683 A    3/1981  Porter
6,001,894 A *  12/1999 Ottersbach ................. C08J 7/18
                                                        427/520
(Continued)

FOREIGN PATENT DOCUMENTS

EP    1145831    10/2001
EP    2308725    4/2011
(Continued)

OTHER PUBLICATIONS

Zacharay, M. et al., "EPR study of persistent free radicals in cross-linked EPDM rubbers", European Polymer Journal, Bd. 44, Nr. 7, Jul. 1, 2008, pp. 2099-2107, Pergamon Press Ltd, Oxford, GB.
International Search Report for Application No. PCT/EP2013/055256 dated Jun. 27, 2013 (English Translation 3 pages).
Database WPI, Week 200925, Thomson Scientific. London. GB;AN 2009-G54572, XP002698182, Apr. 2, 2009.

*Primary Examiner* — Sanza Mcclendon
(74) *Attorney, Agent, or Firm* — Michael Best & Friedrich LLP

(57) ABSTRACT

The present invention relates to a wiper rubber (10) for a windshield wiper, comprising a wiper rubber substructure (1) with a wiper lip section (2) and a reinforcement section (4), the wiper rubber substructure (1) being uncoated and being formed from ethylene-propylene-diene rubber and/or ethylene-propylene rubber. In order to improve the wear resistance, wiping characteristics and wiping quality of the wiper rubber (10), the surface of the wiper rubber substructure (1) at least in a partial region (2c, 2c') of the wiper lip section (2) has been treated with ultraviolet radiation. The present invention further relates to a process for producing a wiper rubber, to a correspondingly produced wiper rubber and to a windshield wiper equipped therewith.

14 Claims, 3 Drawing Sheets

(51) Int. Cl.
*B60S 1/38* (2006.01)
*B29C 35/08* (2006.01)
*B29K 23/00* (2006.01)
*B29K 105/00* (2006.01)
*B29K 105/24* (2006.01)

(52) U.S. Cl.
CPC .. *B29C 2035/0827* (2013.01); *B29K 2023/16* (2013.01); *B29K 2105/0005* (2013.01); *B29K 2105/24* (2013.01); *B60S 2001/3829* (2013.01); *B60S 2001/3836* (2013.01); *B60S 2001/3898* (2013.01); *C08J 2309/00* (2013.01)

(58) Field of Classification Search
CPC ............ C08J 7/2309; B60S 2001/3898; B60S 2001/3836
See application file for complete search history.

(56) References Cited

U.S. PATENT DOCUMENTS

| | | | | |
|---|---|---|---|---|
| 6,451,386 | B1 * | 9/2002 | Simonetti | B01D 67/0088 |
| | | | | 264/413 |
| 2008/0016644 | A1 * | 1/2008 | Mizote | B60S 1/38 |
| | | | | 15/250.361 |

FOREIGN PATENT DOCUMENTS

| | | | |
|---|---|---|---|
| JP | 200220512 A1 * | 1/2002 | |
| JP | 2009067233 | 4/2009 | |
| WO | 03080717 | 10/2003 | |

* cited by examiner

EPDM WIPER RUBBER

BACKGROUND OF THE INVENTION

The present invention relates to a wiper rubber, to a process for the production of a wiper rubber, to a wiper rubber thus produced, and to a resultant windshield wiper.

Wiper rubbers for windshield wipers are generally composed of elastomers and designed to conform to the shape of glazing of a vehicle, and to remain flexible at various temperatures.

Ethylene-propylene-diene rubber (EPDM) and ethylene-propylene rubber (EPM) are synthetic rubbers having in essence a saturated main carbon chain, and are allocated in accordance with DIN ISO 1629 to the M group of synthetic rubbers.

Ethylene-propylene-diene rubber and ethylene-propylene rubber have various advantageous properties, for example high resistance to temperature change. However, they also have a high coefficient of friction, which causes noise during wiping and rapid wear of the wiper rubber.

It is known that the surface of wiper rubbers can be chlorinated in order to reduce friction.

Since, however, ethylene-propylene-diene rubber and ethylene-propylene rubber have a saturated main carbon chain and therefore have no double bonds in the main chain, it is not possible to modify the surface of these via addition reactions, such as chlorination.

The document EP 2 308 725 A1 describes a process for the production of a wiper rubber in which a wiper rubber made of a non-diene-based rubber is irradiated in order to generate free-radical bonding sites, and is coated with monomers, which are linked to the free-radical bonding sites by graft polymerization.

SUMMARY OF THE INVENTION

The subject matter of the present invention is a wiper rubber which is intended for a (vehicle) windshield wiper and which comprises a wiper rubber base with a wiper lip section and with a fixing section. The wiper rubber base here is composed of ethylene-propylene-diene rubber and/or of ethylene-propylene rubber, and is uncoated, and at least in one subregion of the wiper lip section here the surface of the wiper rubber base has been treated with ultraviolet radiation.

The treatment with ultraviolet radiation (UV radiation) can advantageously increase the degree of crosslinking of the ethylene-propylene-diene rubber (EPDM) or ethylene-propylene rubber (EPM). The degree of crosslinking here can in particular be increased in a superficial layer by the ultraviolet radiation. An increase in the degree of crosslinking can advantageously reduce the coefficient of friction of the ethylene-propylene-diene-monomer rubber or ethylene-propylene rubber, and thus the friction of the wiper rubber. Surprisingly, the treatment with ultraviolet radiation can reduce the coefficient of friction of the ethylene-propylene-diene rubber or ethylene-propylene rubber in a way that permits omission of post-treatment, for example of chlorination, or of coatings, for example coatings that reduce sliding friction. Reduction of friction of the wiper rubber can in turn advantageously increase the wear-resistance of the wiper rubber and improve the wiping performance, and also the wiping quality, of the wiper rubber.

The wiper lip section of the wiper rubber base can in particular have two wiping edges, between which there is an edge area, and each of which has an adjacent lateral area of the wiper lip section.

For the purposes of another embodiment, the surface of the wiper rubber base has been treated with ultraviolet radiation at least in a section of the wiper rubber base which forms a lateral area adjacent to a wiping edge in the wiper lip section, and/or which forms a wiping edge of the wiper lip section. In particular, the surface of the wiper rubber base can have been treated with ultraviolet radiation at least in two sections of the wiper rubber base which form lateral areas adjacent to the wiping edges in the wiper lip section, and/or which form the wiping edges of the wiper lip section.

It is preferable that at least in the section which forms the edge area of the wiper lip section, the surface of the wiper rubber base is at least in essence not radiation-treated, in particular is not radiation-treated. A lateral area that is not radiation-treated can advantageously have higher friction, which in turn can have an advantageous effect on the flipover performance of the wiper rubber.

For the purposes of another embodiment, the wiper rubber base comprises at least one photoinitiator. In particular, the at least one photoinitiator can be a multifunctional photoinitiator. By way of example, the wiper rubber base can comprise from ≥1 pphr to ≤25 pphr (pphr/phr: parts per hundred parts of rubber, parts by weight based on one hundred parts by weight of rubber) of photoinitiator(s). During the treatment with ultraviolet radiation the photoinitiator can form free radicals which promote crosslinking of the ethylene-propylene-diene rubber and/or ethylene-propylene rubber and thus increase the degree of crosslinking at the surface. The irradiation of the surface of the wiper rubber base with ultraviolet radiation can in particular take place immediately/directly after the process for production of the wiper rubber base, for example the extrusion process or the injection-molding process (maximal chain mobility). The wiper rubber base can have been subjected, in addition to the treatment with ultraviolet radiation, in particular after the treatment with ultraviolet radiation, to thermal treatment, for example in a salt bath, for example final vulcanization.

The at least one photoinitiator can by way of example be an aromatic photoinitiator. In particular, the at least one photoinitiator can be a phenone and/or a phosphine oxide, for example acylphosphine oxide. The at least one photoinitiator can by way of example be selected from the group consisting of benzophenones, such as benzophenone, 4 methylbenzophenone, 4,4'-bis(dimethylamino)benzophenone, and/or alkylphenones, such as acetophenones, for example α-dialkoxyacetophenones, diethoxyacetophenones, dimethoxyphenylacetophenones, and/or hydroxyalkylphenones, for example α hydroxyalkylphenones, and/or aminoalkylphenones, for example α-aminoalkylphenones, and/or benzoin ethers, for example benzoin isopropyl ether, benzoin ethyl ether or benzoin isobutyl ether, and/or xanthones, for example chlorothioxanthones, isopropylthioxanthones, methylthioxanthones, and/or phosphine oxides, and mixtures thereof.

For the purposes of a specific embodiment the at least one photoinitiator is a benzophenone, for example benzophenone, 4-methylbenzophenone, and/or 4,4'-bis(dimethylamino)benzophenone.

For the purposes of another embodiment, the wiper rubber base has been formed by coextrusion or multicomponent injection molding of at least two ethylene-propylene-diene rubber components and/or ethylene-propylene rubber components, where one of the components comprises the at least one photoinitiator. It is thus possible to provide the material of the wiper rubber base with a higher degree of crosslinking in the regions comprising photoinitiator. It is thus advantageously possible to achieve different properties of the material in certain regions of the wiper rubber.

For the purpose of one specific form of said embodiment, at least one section of the wiper rubber base which forms a lateral area adjacent to a wiping edge in the wiper lip section, and/or which forms a wiping edge of the wiper lip section, has been formed from the component comprising photoinitiator. The wiper rubber region that mainly affects the wiping performance and the wiping quality of the wiper rubber, namely the lateral areas adjacent to the wiping edges, can thus advantageously be specifically provided with a high degree of crosslinking and thus with a lower coefficient of friction.

It is possible here to form the entire tip of the wiper lip section from the component comprising photoinitiator.

For the purposes of another specific form of said embodiment, however, two sections of the wiper rubber base, each of which forms a lateral area adjacent to a wiping edge in the wiper lip section, and/or each of which forms a wiping edge of the wiper lip section, are formed from the component comprising photoinitiator. Between these two sections, the wiper lip section can be composed of another, in particular photoinitiator-free component. The wiper rubber regions that mainly affect the wiping performance and the wiping quality of the wiper rubber, namely the lateral areas adjacent to the wiping edges, can thus advantageously be specifically provided with a high degree of crosslinking and thus with a lower coefficient of friction, while a section (inner section) situated between these in the wiper lip section can have a smaller degree of crosslinking and thus higher flexibility. It is thus possible firstly to achieve a further improvement in the wiping performance and the wiping quality of the wiper rubber and secondly to reduce the quantity of photoinitiator used.

For the purposes of another embodiment, the wiper rubber base is composed entirely of an ethylene-propylene-diene rubber and/or ethylene-propylene rubber component which comprises the at least one photoinitiator. By way of example, the wiper rubber base here can have been produced by an extrusion process or injection-molding process. Use of a single component can advantageously simplify the production process.

In respect of other technical features and advantages of the wiper rubber of the invention, reference is hereby made explicitly to the explanations relating to the process of the invention, the wiper rubber produced in the invention, and the windshield wiper of the invention, and also the figures.

Another subject matter of the present invention is a process for the production of a wiper rubber for a windshield wiper, comprising the steps of:
 a) formation of a wiper rubber base with a wiper lip section and with a fixing section made of at least one ethylene-propylene-diene rubber component and/or ethylene-propylene rubber component, and
 b) irradiation of at least one subregion of the wiper lip section with ultraviolet radiation.

It is preferable here that, in particular prior to and/or during, and/or after step b), the at least one subregion that has been irradiated, or that is to be irradiated with ultraviolet radiation in the wiper lip section is not coated with polymerizable monomers, in particular compounds. Furthermore, it is also not essential that, in particular prior to and/or during, and/or after step b), the at least one subregion that has been irradiated, or that is to be irradiated with ultraviolet radiation in the wiper lip section is coated with other materials that reduce sliding friction.

However, it can be advantageous that the at least one subregion that is to be irradiated with ultraviolet radiation in the wiper lip section is coated with at least one photoinitiator, in order to improve the degree of crosslinking of the ethylene-propylene-diene rubber and/or ethylene-propylene rubber in said subregion.

For the purposes of one embodiment, the process therefore moreover comprises, prior to step b), and in particular after step a), step a1): application of at least one photoinitiator to the at least one subregion that is to be irradiated with ultraviolet radiation in the wiper lip section.

For the purposes of an embodiment, at least one of the ethylene-propylene-diene rubber components and/or ethylene-propylene rubber components comprises at least one photoinitiator.

In particular, the at least one photoinitiator can be a multifunctional photoinitiator. By way of example, the components comprising photoinitiator can comprise from ≥1 pphr to ≤25 pphr (pphr/phr: parts per hundred parts of rubber, parts by weight based on one hundred parts by weight of rubber) of photoinitiator(s).

The at least one photoinitiator can by way of example be an aromatic photoinitiator. In particular, the at least one photoinitiator can be a phenone and/or a phosphine oxide, for example acylphosphine oxide. The at least one photoinitiator can by way of example be selected from the group consisting of benzophenones, such as benzophenone, 4 methylbenzophenone, 4,4'-bis(dimethylamino)benzophenone, and/or alkylphenones, such as acetophenones, for example α-dialkoxyacetophenones, diethoxyacetophenones, dimethoxyphenylacetophenones, and/or hydroxyalkylphenones, for example α hydroxyalkylphenones, and/or aminoalkylphenones, for example α-aminoalkylphenones, and/or benzoin ethers, for example benzoin isopropyl ether, benzoin ethyl ether or benzoin isobutyl ether, and/or xanthones, for example chlorothioxanthones, isopropylthioxanthones, methylthioxanthones, and/or phosphine oxides, and mixtures thereof.

By way of example, it is possible in step b) to irradiate at least one section of the wiper rubber base which forms a lateral area adjacent to a wiping edge, and/or which forms a wiping edge of the wiper lip section. In particular, it is possible in step b) that at least two sections of the wiper rubber base, each of which forms a lateral area adjacent to a wiping edge in the wiper lip section, and/or each of which forms a wiping edge of the wiper lip section, have been treated with ultraviolet radiation.

In step a) the wiper rubber base can be, by way of example, extruded or injection-molded.

It is possible here in step a) to form the wiper rubber base entirely from an ethylene-propylene-diene rubber and/or ethylene-propylene rubber component, by way of example comprising photoinitiator.

However, it is equally possible to form the wiper rubber base in step a) by coextrusion or multicomponent injection molding. It is in particular possible here to use at least two ethylene-propylene diene rubber and/or ethylene-propylene rubber components. One of the components here can comprise the at least one photoinitiator.

In particular, it is possible that in step a) at least one section of the wiper rubber base which forms a lateral area adjacent to a wiping edge in the wiper lip section, and/or which forms a wiping edge of the wiper lip section, is composed of the component comprising a photoinitiator. It is possible here that in step a) the entire tip of the wiper lip section is formed from the component comprising a photoinitiator. In particular, however, it is possible in step a) that two sections of the wiper rubber base, each of which forms a lateral area adjacent to a wiper lip in the wiper lip section, and/or each of which forms a wiping edge of the wiper lip section, are formed from the component comprising a photoinitiator. It is possible here, that between these two sections, the wiper lip section is composed of another, in particular photoinitiator-free, component.

The process can moreover comprise, after the step b), the step c): thermal treatment of the wiper rubber base, in particular (final) vulcanization.

Step c) can in particular be carried out in a vulcanization apparatus which by way of example comprises a heat-treatment medium, an example being a liquid salt bath. The liquid salt bath can by way of example be a melt which by way of example comprises a mixture of potassium nitrate and/or sodium nitrate, and/or sodium nitrite, and/or lithium nitrite. Step b) can by way of example be carried out at a temperature in the range from ≥150° C. to ≤300° C.

In particular, it is possible in step a) that the wiper rubber base is initially formed as double wiper rubber base profile, the cross-sectional area of which corresponds to the cross-sectional area of two wiper rubber bases connected to one another by way of the edge areas of the two wiper lip sections. The double wiper rubber base profile here can in particular be formed in step a) as a strand, for example an extruded strand. In this case the process can in particular also comprise the step of: d): separation of the double wiper rubber base profile into individual wiper rubber bases. The double wiper rubber base profile can by way of example be separated, in particular horizontally, between the two wiper lip sections. To the extent that the double wiper rubber base profile takes the form of a strand, the strand can moreover be separated, in particular more than once, perpendicularly to the longitudinal direction of the wiper rubber strand, for example in order to produce a plurality of wiper rubbers.

When the wiper rubber base is initially formed as double wiper rubber base profile in step a), and when, after step b) and/or c), the double wiper rubber base profile is separated, between the two wiper lip sections, into individual wiper rubber bases, with formation of the edge areas of the wiper lip sections of the wiper rubber bases, an advantageous result that can be achieved is that the edge areas are at least in essence not radiation-treated, in particular are not radiation-treated, and therefore have higher friction. Higher friction of the edge area that has not been radiation-treated can in turn have an advantageous effect on the flipover performance of the resultant wiper rubber.

In respect of other technical features and advantages of the process of the invention, reference is hereby made explicitly to the explanations relating to the wiper rubber of the invention, the wiper rubber produced in the invention, and the windshield wiper of the invention, and also the figures.

Another subject matter of the present invention is a wiper rubber produced by a process of the invention.

The present invention further relates to a windshield wiper which comprises a wiper rubber of the invention and/or which comprises a wiper rubber produced in the invention.

In respect of other technical features and advantages of the wiper rubber produced in the invention and the windshield wiper of the invention, reference is hereby made explicitly to the explanations relating to the wiper rubber of the invention, the wiper rubber produced in the invention, and also the figures.

BRIEF DESCRIPTION OF THE DRAWINGS

Other advantages and advantageous embodiments of the subject matter of the invention are illustrated by the drawings and explained in the description below. It should be noted here that the drawings are merely descriptive and are not intended to restrict the invention in any way.

DETAILED DESCRIPTION

Figure 1:
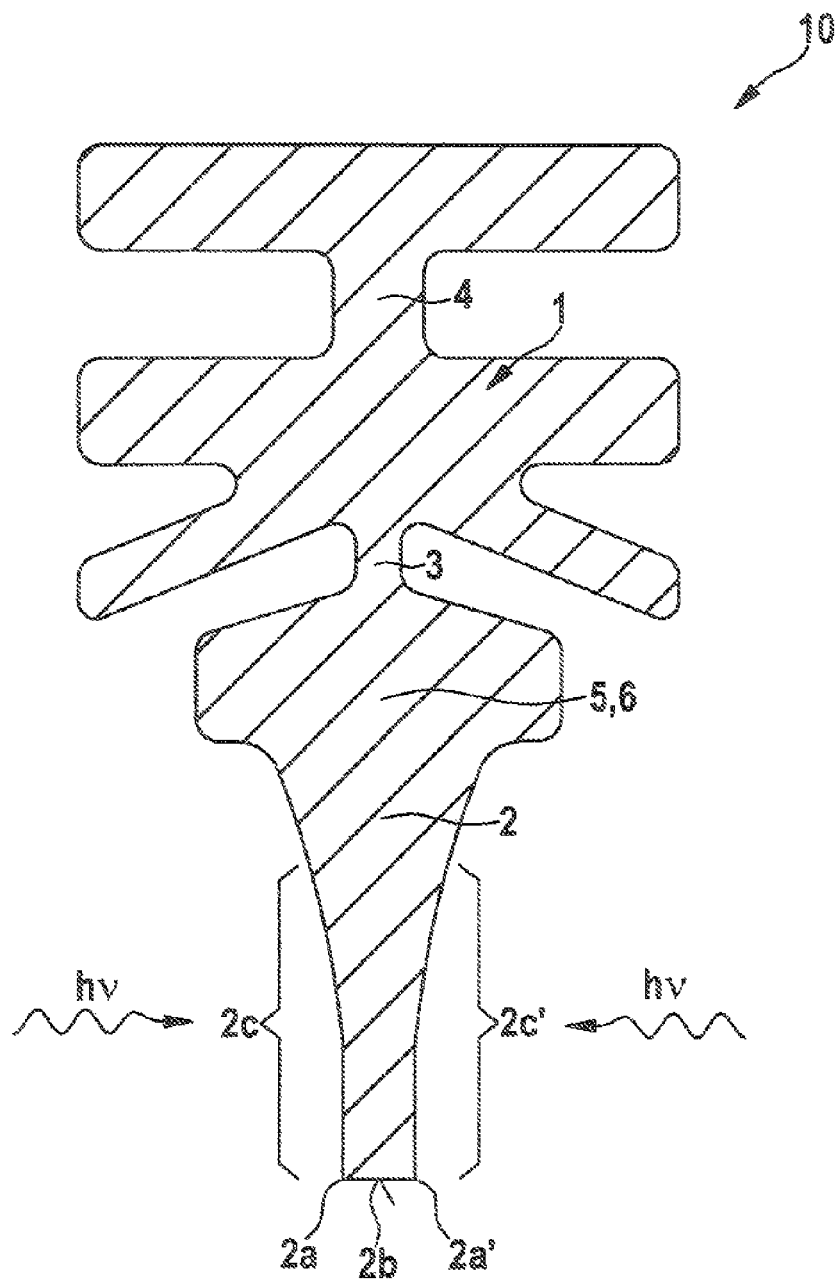
FIG. 1 is a diagram of a cross section of an embodiment of a wiper rubber of the invention.

FIG. 1 is a diagram of a cross section of an embodiment of a wiper rubber 10 of the invention. FIG. 1 shows that the wiper rubber 10 comprises a wiper rubber base 1 made of ethylene-propylene-diene rubber and/or ethylene-propylene rubber, which has a wiper lip section 2 connected by way of a tiltable web section 3 to a fixing section 4. FIG. 1 shows that the wiper lip section 2 has two wiping edges 2a, 2a', between which there is an edge area 2b, and that each of 2a, 2a' has an adjacent lateral area 2c, 2c'. Contributors to the wiping function of the wiper rubber 10 are not only the two wiping edges 2a, 2a' of the wiper lip section 2 but also in particular the two lateral areas 2c, 2c' adjacent to the wiping edges 2a, 2a'. It has proven to be advantageous here in particular to provide the lateral areas 2c, 2c' of the wiper lip section 2, and the wiping edges 2a, 2a' of the wiper lip section, with a low coefficient of friction.

The braces and wavy arrows in FIG. 1 show that in particular the surface of the wiper rubber base 1 can have been treated with ultraviolet radiation in the lateral areas 2c, 2c', these being subregions adjacent to the wiping edges 2a, 2a' in the wiper lip section 2.

The treatment with ultraviolet radiation can advantageously achieve crosslinking of the ethylene-propylene-diene rubber and/or ethylene-propylene rubber of the wiper rubber base 1 in the irradiated region, and can thus reduce the coefficient of friction of the wiper rubber base 1 in this region.

The degree of crosslinking here can advantageously be increased in that a photoinitiator, for example a phenone or phosphine oxide, for example benzophenone, comprises the ethylene-propylene-diene rubber and/or ethylene-propylene rubber of the wiper rubber base 1.

It is preferable that the edge area 2b has not been radiation-treated. This can in particular be achieved in that the wiper rubber base 1 is produced from a double wiper rubber base profile (a profile of cross section corresponding to the shape of a cross section through two wiper rubber bases 1 connected by way of the edge areas 2b), which is divided to form two edge areas 2b. The higher friction of the edge area 2b that has not been radiation-treated actually has an advantageous effect on the flipover performance of the wiper rubber 10.

For the purposes of the embodiment shown in FIG. 1, the wiper rubber base 1 can be composed entirely of an ethylene-propylene-diene rubber and/or ethylene-propylene rubber component 5 which either, in the case of 5, is photoinitiator-free or, in the case of 6, comprises photoinitiator.

Figure 2:
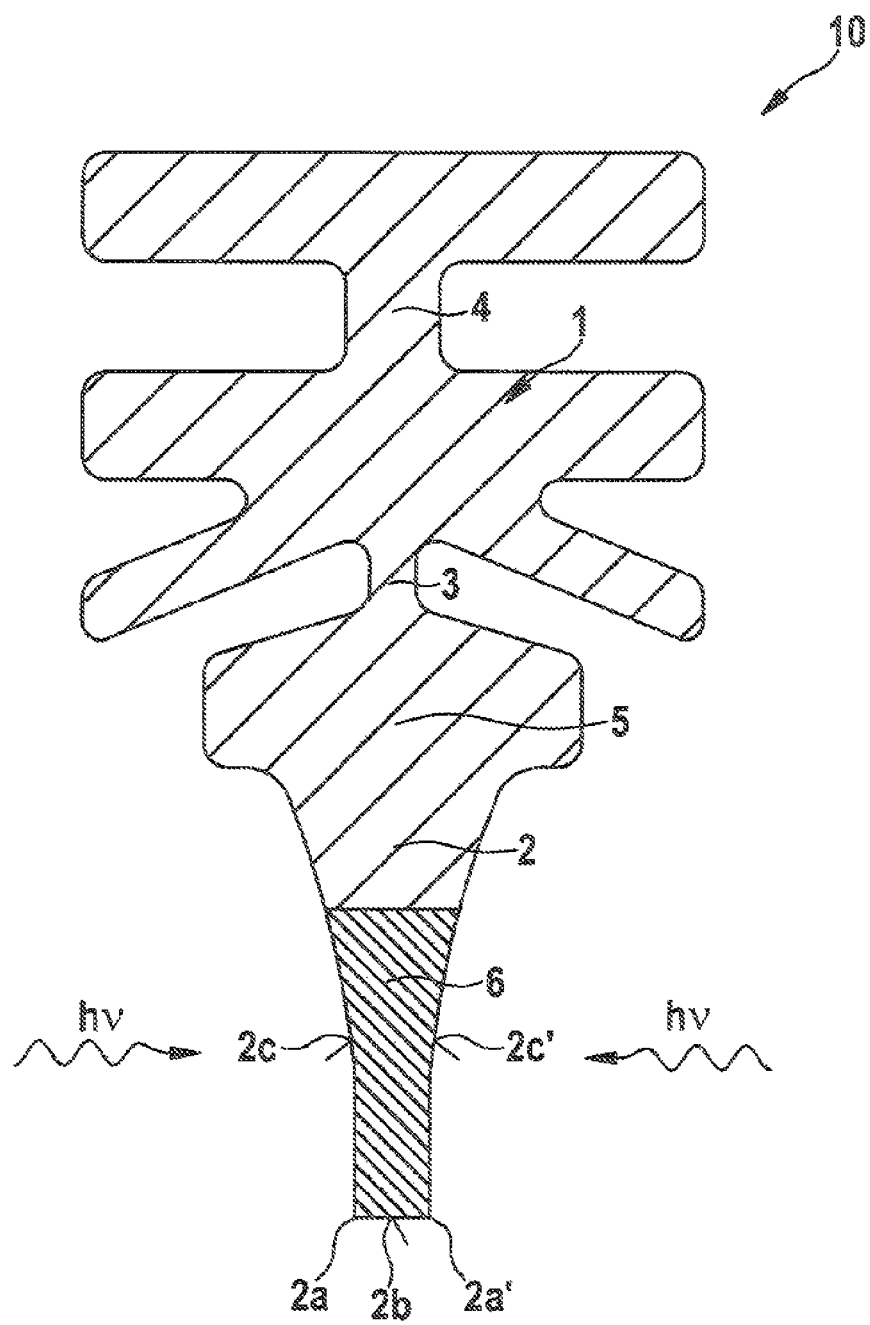
FIG. 2 is a diagram of a cross section of another embodiment of a wiper rubber of the invention.

The embodiment shown in FIG. 2 differs in essence from the embodiment shown in FIG. 1 in that the wiper rubber base 1 has been formed by coextrusion or multicomponent injection molding from two ethylene-propylene-diene rubber and/or ethylene-propylene rubber components 5, 6, where one of the components 6 comprises photoinitiator and the other component 5 is photoinitiator-free. For the purposes of the embodiment shown in FIG. 2, the entire tip of the wiper lip section 2 here is composed of the component 6 comprising photoinitiator.

Figure 3:
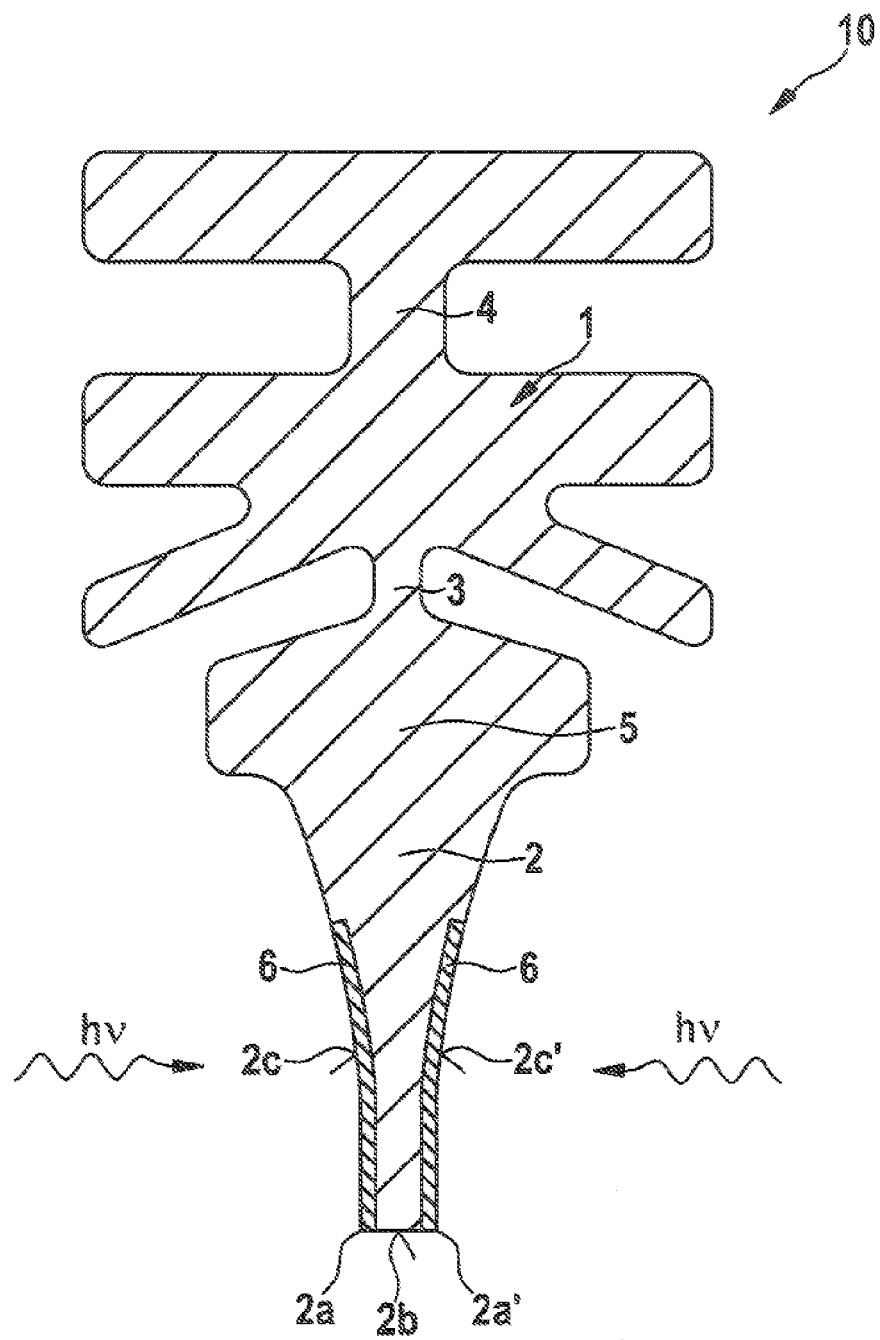
FIG. 3 is a diagram of a cross section of another embodiment of a wiper rubber of the invention.

The embodiment shown in FIG. 3 differs in essence from the embodiment shown in FIG. 2 in that two sections of the wiper rubber base 1, each of which forms one of the lateral areas 2c, 2c' adjacent to the wiping edges 2a, 2a' in the wiper lip section 2, and which also form the wiping edges 2a, 2a' of the wiper lip section 2, are composed of the component 6 comprising photoinitiator. The section situated between these in the wiper lip section 2, and also the other sections of the wiper rubber base 1, are composed here of the photoinitiator-free component 5.

What is claimed is:

1. A wiper rubber (10) for a windshield wiper, comprising a wiper rubber base (1) with a wiper lip section (2) and with a fixing section (4),
    wherein the wiper rubber base (1) is formed from ethylene-propylene-diene rubber and/or ethylene-propylene rubber,
    wherein the wiper rubber base (1) is uncoated, and
    wherein at least in a subregion (2c, 2c') of the wiper lip section (2) a surface of the wiper rubber base (1) has been treated with ultraviolet radiation.

2. A process for the production of a wiper rubber (10) for a windshield wiper, comprising the steps of:
    a) formation of a wiper rubber base (1) with a wiper lip section (2) and with a fixing section (4) made of at least one ethylene-propylene-diene rubber component and/or ethylene-propylene rubber component (5, 6), and
    b) irradiation of at least one subregion (2c, 2c') of the wiper lip section (2) with ultraviolet radiation,
    wherein the at least one subregion (2c, 2c') that has been irradiated, or that is to be irradiated with ultraviolet radiation in the wiper lip section (2) is not coated with polymerizable monomers.

3. A windshield wiper comprising a wiper rubber having a wiper rubber base (1) with a wiper lip section (2) and with a fixing section (4),
    wherein the wiper rubber base (1) is formed from ethylene-propylene-diene rubber and/or ethylene-propylene rubber,
    wherein the wiper rubber base (1) is uncoated by monomers or other coatings, and
    wherein at least in a subregion (2c, 2c') of the wiper lip section (2) a surface of the wiper rubber base (1) has been treated with ultraviolet radiation.

4. The windshield wiper as claimed in claim 3, wherein the wiper rubber base (1) comprises at least one photoinitiator.

5. The windshield wiper as claimed in claim 4 wherein the wiper rubber base (1) has been formed by coextrusion or multicomponent injection molding of at least two ethylene-propylene-diene rubber components and/or ethylene-propylene rubber components (5, 6), wherein one of the components (6) comprises the at least one photoinitiator.

6. The windshield wiper as claimed in claim 5, wherein at least one section of the wiper rubber base (1), which forms a lateral area (2c, 2c') adjacent to a wiping edge (2a, 2a') in the wiper lip section (2), and/or which forms a wiping edge (2a, 2a') of the wiper lip section (2), is composed of the one of the components (6) comprising a photoinitiator.

7. The windshield wiper as claimed in claim 5, wherein two sections of the wiper rubber base (1), each of which forms a lateral area (2c, 2c') adjacent to a wiping edge (2a, 2a') in the wiper lip section (2), and/or each of which forms a wiping edge (2a, 2a') of the wiper lip section (2), are formed from the one of the components (6) comprising photoinitiator.

8. The windshield wiper as claimed in claim 4, wherein the wiper rubber base (1) is composed entirely of an ethylene-propylene-diene rubber and/or ethylene-propylene rubber component (6) which comprises the at least one photoinitiator.

9. The windshield wiper as claimed in claim 4, wherein the at least one photoinitiator is selected from the group consisting of benzophenones, alkylphenones, benzoin ethers, xanthones, phosphine oxides, and mixtures thereof.

10. The windshield wiper as claimed in claim 3, wherein the wiper lip section (2) of the wiper rubber base (1) has two wiping edges (2a, 2a'), between which there is an edge area (2b), and each of which has an adjacent lateral area (2c, 2c') of the wiper lip section (2), and wherein the surface of the wiper rubber base (1) has been treated with ultraviolet radiation at least in a section of the wiper rubber base (1) which forms a lateral area (2c, 2c') adjacent to a wiping edge (2a, 2a') in the wiper lip section (2), and/or which forms a wiping edge (2a, 2a') of the wiper lip section (2).

11. The windshield wiper as claimed in claim 3, wherein the wiper rubber base (1) comprises at least one multifunctional photoinitiator, wherein the at least one photoinitiator is a phenone or phosphine oxide.

12. The windshield wiper as claimed in claim 3, wherein the wiper rubber base (1) comprises at least one multifunctional photoinitiator, wherein the at least one photoinitiator is a phenone or phosphine oxide, and wherein where the wiper rubber base (1) comprises from ≥1 pphr to ≤25 pphr of photoinitiators.

13. The windshield wiper as claimed in claim 4, wherein the at least one photoinitiator is selected from the group consisting of benzophenones, including benzophenone, 4-methylbenzophenone, 4,4'-bis(dimethylamino)benzophenone, alkylphenones, including acetophenones, including α-dialkoxyacetophenones, diethoxyacetophenones, and/or dimethoxyphenylacetophenones, hydroxyalkylphenones, am inoalkylphenones, benzoin ethers, including benzoin isopropyl ether, benzoin ethyl ether and/or benzoin isobutyl ether, xanthones, including chlorothioxanthones, isopropylthioxanthones, and/or methylthioxanthones, phosphine oxides, and mixtures thereof.

14. The windshield wiper as claimed in claim 3, wherein the wiper lip section (2) of the wiper rubber base (1) has two wiping edges (2a, 2a'), between which there is an edge area (2b), and each of which has an adjacent lateral area (2c, 2c') of the wiper lip section (2), wherein the surface of the wiper rubber base (1) has been treated with ultraviolet radiation at least in a section of the wiper rubber base (1) which forms a lateral area (2c, 2c') adjacent to a wiping edge (2a, 2a') in the wiper lip section (2), and/or which forms a wiping edge (2a, 2a') of the wiper lip section (2), and wherein the surface of the wiper rubber base (1) in the section which forms the edge area (2b) of the wiper lip section (2) is at least in essence not radiation-treated.

* * * * *